E. AINSWORTH.
Improvement in Non-Conducting Covering for Steam-Boilers.
No. 131,204. Patented Sep. 10, 1872.
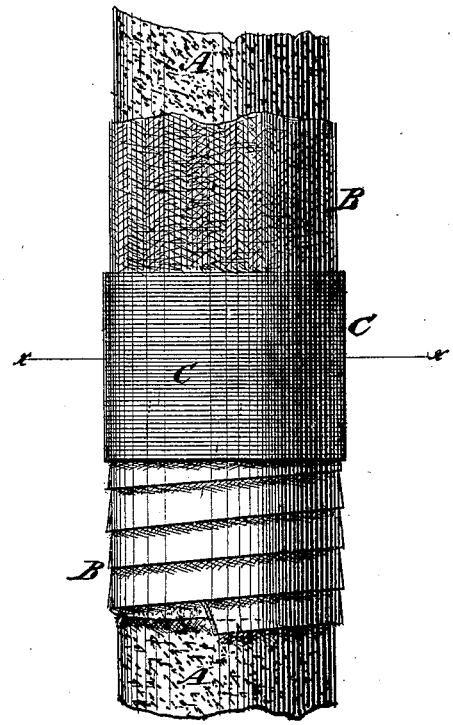
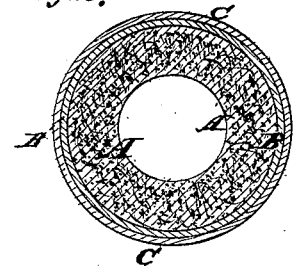

UNITED STATES PATENT OFFICE.

ELEAZER AINSWORTH, OF WILMINGTON, DELAWARE.

IMPROVEMENT IN NON-CONDUCTING COVERINGS FOR STEAM-BOILERS.

Specification forming part of Letters Patent No. 131,204, dated September 10, 1872.

Specification describing a new and useful Improvement in Non-Conducting Covering for Steam - Boilers, &c., invented by ELEAZER AINSWORTH, of Wilmington, in the county of New Castle and State of Delaware.

The object of this invention is to furnish a good non-conducting material, composition, or substance for preventing the radiation of heat and the consequent condensation of steam in steam-boilers, steam-pipes, and for all similar purposes; and consists in the ingredients and coatings hereinafter specified, prepared and applied as described.

The drawing represents the mode of application or the arrangement of parts.

Figure 1 is an outside view of a piece of the covering as applied to a steam-pipe. Fig. 2 is a cross-section of Fig. 1 on the line $x\ x$.

Similar letters of reference indicate corresponding parts.

The covering which we apply consists of three coatings: First, we apply directly to the boiler or pipe a coat composed of the following ingredients, in about the proportions named: One barrel of ground sumac or spent tan-bark, ten pounds alum, one peck of hair, one pound of cocoanut fiber or jute, two gallons slaughter-house blood, twenty pounds pulverized soap-stone or ground clay, five pounds dextrine, ten pounds rye-flour. When these ingredients are well mixed together a plastic material is formed which adheres together and forms a compact body. No alkaline substance is used in this composition, consequently the iron is not corroded thereby, nor does it adhere to the iron, but shrinks from it. This composition coating is marked A in the drawing, and is inclosed by a coating of canvas or muslin or equivalent material, marked B, wound around spirally, as seen, or applied in any other manner. C is the exterior coating, which is composed of a portion of the within-named ingredients, as dextrine and pulverized soap-stone; or those ingredients may be confined entirely to the outer coating C, as may be deemed best.

The importance of protecting steam-boilers and steam - pipes with non - conducting substance, and thereby preventing the condensation of steam and the consequent loss of fuel, is well understood by all. The difficulty has been to obtain a good non-conductor at a reasonable cost, and to secure it in a proper manner to the boiler. This I claim to have accomplished in the manner I have described.

Having thus described my invention, I claim as new and desire to secure by Letters Patent—

1. A non-conducting composition for steam-boilers, consisting of sumac, alum, hair, jute, blood, soap-stone, dextrine, and flour mixed in the proportions specified, and formed into a plastic mass, as described.

2. The above composition A, the spiral fabric B, and the outer coating C, applied in combination to form a boiler cover.

ELEAZER AINSWORTH.

Witnesses:
    JOSEPH BELLAH,
    JOSEPH ANDREWS.